US008428981B2

(12) United States Patent
Li et al.

(10) Patent No.: US 8,428,981 B2
(45) Date of Patent: Apr. 23, 2013

(54) METHOD AND SYSTEM FOR AUTOMATICALLY MAINTAINING THE CONSISTENCY OF AN INFORMATION SYSTEM

(75) Inventors: Peisong Li, Shanghai (CN); Peng Gao, Shanghai (CN); Ligang Cheng, Shanghai (CN); Mu Yu, Shanghai (CN)

(73) Assignee: SAP AG, Walldorf (DE)

( * ) Notice: Subject to any disclaimer, the term of this patent is extended or adjusted under 35 U.S.C. 154(b) by 1541 days.

(21) Appl. No.: 11/637,523

(22) Filed: Dec. 11, 2006

(65) Prior Publication Data
US 2008/0140475 A1 Jun. 12, 2008

(51) Int. Cl.
*G06Q 30/00* (2006.01)
(52) U.S. Cl.
USPC ...... 705/7; 705/34; 705/35; 705/36; 707/101; 707/102; 707/103
(58) Field of Classification Search ........... 705/7, 34, 705/35, 36; 707/101, 102, 103
See application file for complete search history.

(56) References Cited

U.S. PATENT DOCUMENTS

| 5,878,431 A * | 3/1999 | Potterveld et al. ...... 707/103 R |
| 2003/0216938 A1* | 11/2003 | Shour ...... 705/2 |
| 2003/0220855 A1* | 11/2003 | Lam et al. ...... 705/34 |
| 2005/0262130 A1* | 11/2005 | Mohan ...... 707/102 |
| 2008/0104092 A1* | 5/2008 | Cummins ...... 707/101 |

OTHER PUBLICATIONS

Webpage entitled "IBM ILOG", accessed from the Internet at <http://www.ilog.com>, Nov. 29, 2012.
Webpage entitled "Drools—JBoss Community", accessed from the Internet at <http://www.jboss.ort/drools/>, Nov. 29, 2012.

* cited by examiner

*Primary Examiner* — Nga B. Nguyen
(74) *Attorney, Agent, or Firm* — Mintz Levin Cohn Ferris Glovsky and Popeo, P.C.

(57) ABSTRACT

An Enterprise Resource Planning (ERP) system maintains a plurality of business elements. Each of the business elements represents a business function that may or may not be needed depending on a customer's business requirement. A scoping process is a process which determines what business elements are required according to the customer's business requirement and the relationships exist among some of the business elements. The ERP system provides an automatic business configuration subsystem. The automatic business configuration subsystem maintains a set of rules. Each of the rules representing a relationship between two business elements maintained at the ERP system. The automatic business configuration subsystem automatically determines which business elements are required and need to be implemented based on the set of rules. The automatic business configuration subsystem may also automatically determine whether statuses of the business elements are consistent with each other in view of the rules.

15 Claims, 13 Drawing Sheets

| Name to be defined | Production |
|---|---|
| Constraint Rule | IF Conditional-Expression THEN Consequence-Statement |
| | IF Conditional-Expression THEN To-Be-Select-Statement ELSE To-Be-Deselect-Statement |
| | IF Conditional-Expression THEN To-Be-Select-Statement ELSE IF Conditional-Statement THEN To-Be-Deselect-Statement |
| Default Value Rule | IF Conditional-Expression THEN To-Be-Select-Statement |
| Conditional-Expression | And-Expression |
| | Or-Expression |
| And-Expression | Equality-expression |
| | And-expression AND Equality-expression |
| Equality-Expression | Element-Identifier IS SELECTED |
| | Element-Identifier IS NOT SELECTED |
| Or-Expression | And-Expression OR And-Expression |
| Consequence-Statement | To-Be-Select-Statement |
| | To-Be-Deselect-Statement |
| To-Be-Select-Statement | SELF SELECTED |
| To-Be-Deselect-Statement | SELF DESELECTED |
| Element-Identifier | LONG |

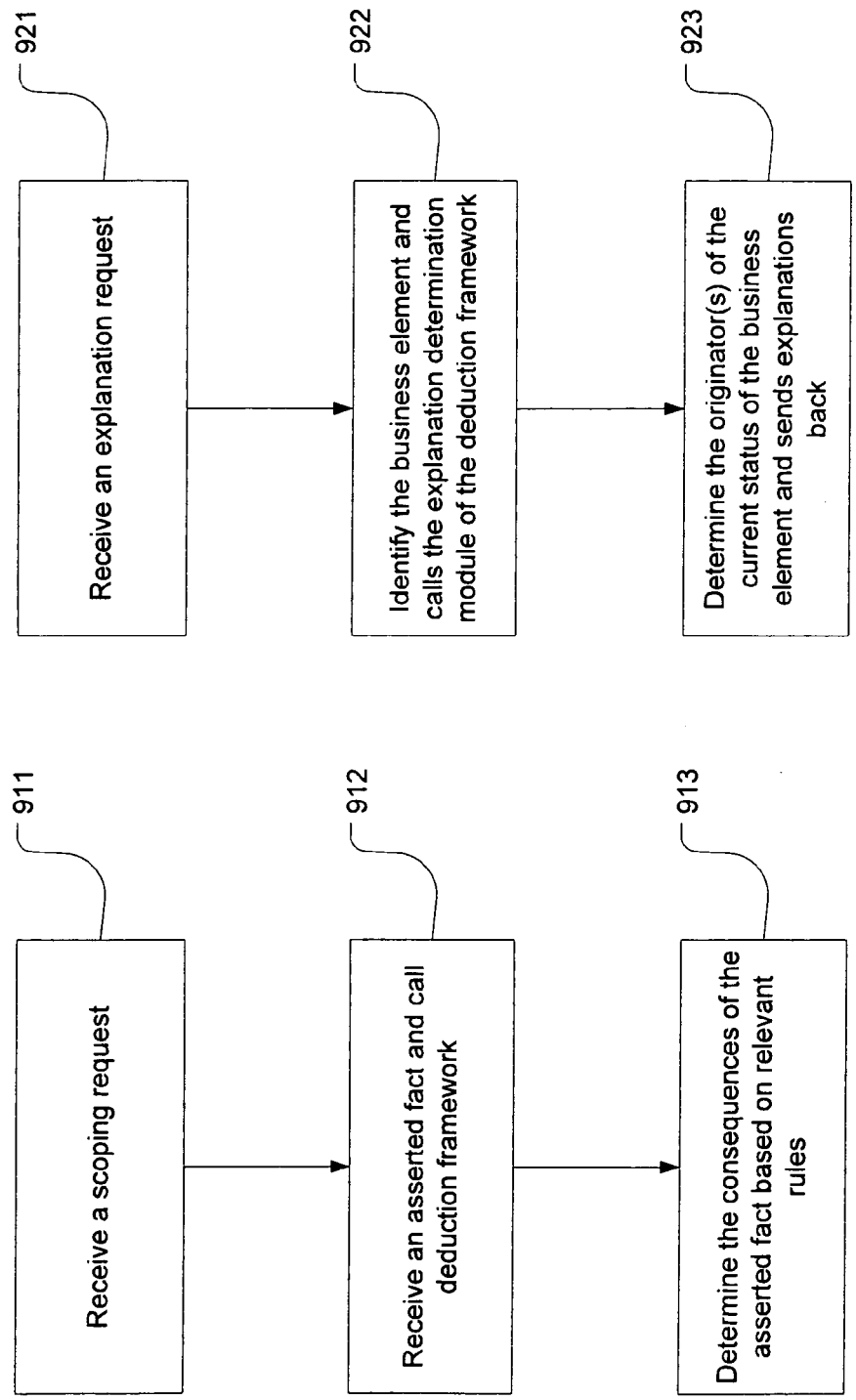

METHOD AND SYSTEM FOR AUTOMATICALLY MAINTAINING THE CONSISTENCY OF AN INFORMATION SYSTEM

COPYRIGHT NOTICES

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

At least one embodiment of the present invention pertains to Information systems, and more particularly, to automatically configuring an information system.

BACKGROUND

As Enterprise Resource Planning (ERP) methodology has become more popular, software applications have emerged to help business managers implement ERP in business activities such as inventory control, order tracking, customer service, finance and human resources, etc.

Business Configuration of an ERP system requires comprehensive knowledge of the ERP system and its capabilities. Specifically, dependencies among different functions of the ERP system and their configurations are required in order to determine what functions need to be implemented and what system behaviour must be configured. For example, if a customer chooses to implement the "Sales Order Management" function, the customer must also implement the "Basic Sales Order" and "Pricing" functions if the "Sales Order Management" function depends on the "Basic Sales Order" function and the "Pricing" function. Failure to implement these functions means that the customer cannot run "Sales Order Management" function.

In conventional ERP systems, a scoping process (i.e., the task of determining what business functions of an ERP system are required according to a customer's business requirement) is handled manually by experienced, highly qualified consultants by analyzing the business requirement, determining a business solution, and implementing the business solution by configuring the ERP system. The more complicated the business system is, the more difficult to implement the business solution in a purely manual fashion.

SUMMARY OF THE INVENTION

The present invention includes a method for automatically configuring an Enterprise Resource Planning (ERP) system. The method includes maintaining a plurality of business elements at an Enterprise Resource Planning (ERP) system. The method further includes automatically determining whether statuses of the plurality of business elements are consistent with each other.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which:

FIG. 3a illustrates an example of a set of rule grammars according to one embodiment;

FIG. 9b is a flow diagram illustrating a scoping process according to another embodiment;

FIG. 9c is a flow diagram illustrating a scoping process according to another embodiment;

DETAILED DESCRIPTION

A method and system for automatically configuring an Enterprise Resource Planning (ERP) system are described. References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

1. Enterprise Resource Planning System

Figure 1:
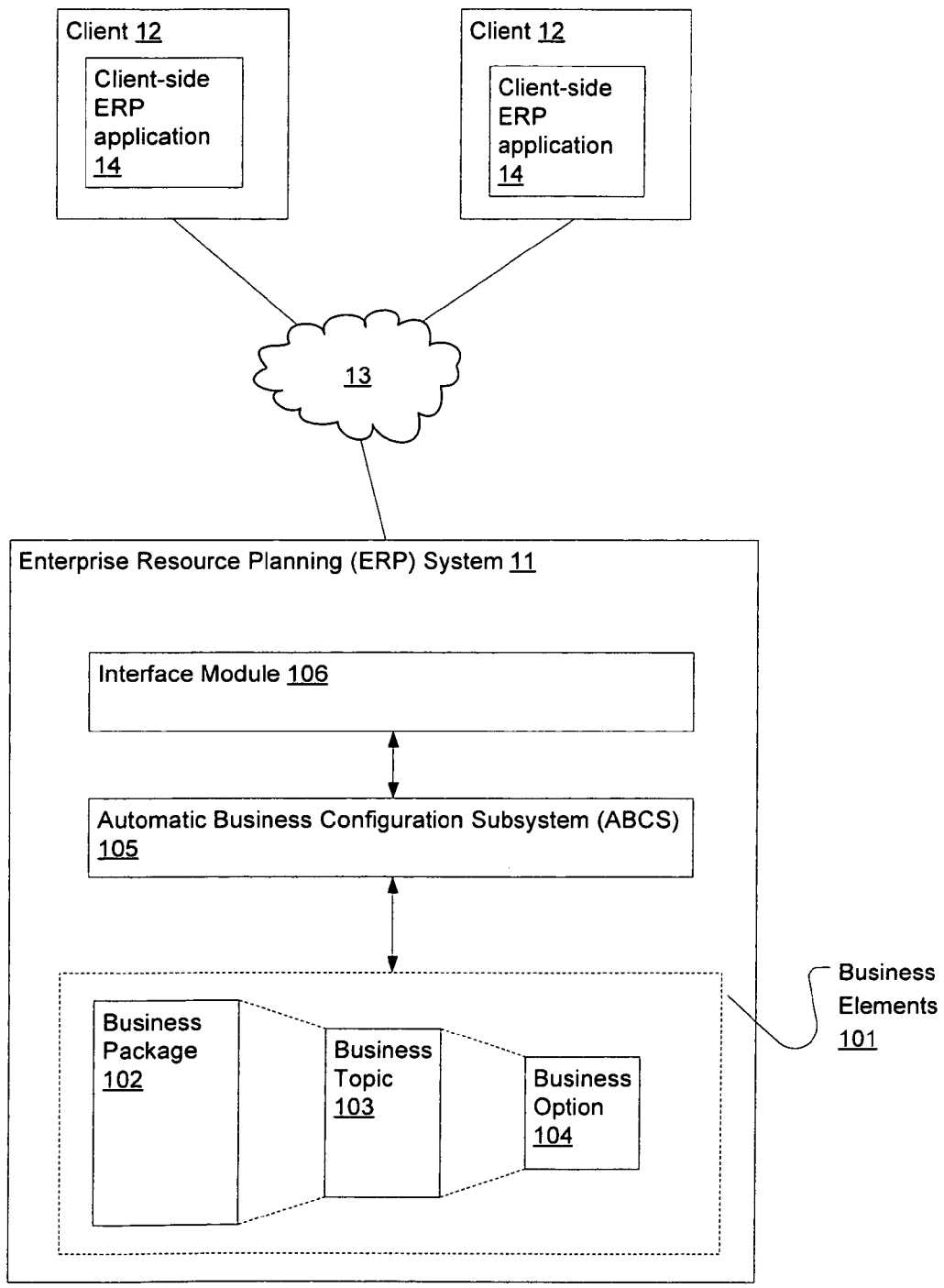
FIG. 1 illustrates a network environment in which an embodiment of the invention may be implemented.

FIG. 1 illustrates a network environment in which an embodiment of the invention may be implemented. As shown, an Enterprise Resource Planning (ERP) system 11 is communicatively coupled to a number of clients 12 via an interconnect 13. The interconnect 13 may be essentially any type of computer network, such as a local area network (LAN), a wide area network (WAN), metropolitan area network (MAN) or the Internet, and may implement the Internet Protocol (IP). Each of the clients 12 runs a client-side ERP application 14. Such an application may be, for example, a web-based application that allows a user to login to the ERP system 11 and to work on a business configuration project. A user may communicate with the ERP system 11 by submitting commands and receiving results or instructions through an interface provided by the client-side ERP application 14. In one embodiment, such an interface is a Graphic User Interface (GUI).

The ERP system 11 provides a set of business elements 101. Each business element 101 may be a business package 102, a business topic 103, or a business option 104. A business package 102 may include a set of business topics 103. A business topic 103 may include a set of business options 104. For example, an ERP system may provide "Sales Order Management" business package. The "Sales Order Management" business package may include business topics such as "Sales Order Quotation", "Pricing", and "Product Configuration", etc. The business topic "Pricing" may include business options such as "Standard Pricing", "Seasonal Goods", etc.

As a result of a business requirement, the function of a business element may depend on the function of another business element. In that case, a dependency relationship exists between the two business elements. In known prior art ERP systems, a user needs to manually determine what business elements need to be selected and implemented based on business requirements and dependency relations among these business elements. The present invention includes an ERP system which may automatically determine what business elements need to be selected and implemented based on the business requirement and dependency relations among these business elements.

In one embodiment, the ERP system 11 may include an automatic business configuration subsystem (ABCS) 105. The ABCS 105 models the dependency relations as rules. A rule dictates whether particular business elements require or exclude other business elements. Here, the status of a business element includes two aspects. The first aspect is the business element's selection status. The value of a selection status may be "selected" or "deselected". The second aspect is the business element's changeability status. The value of a changeability status may be "changeable" or "nonchangeable". If a business element's selection status is "selected", functions related to the business element need to be implemented during the configuration process. If a business element's selection status is "deselected", functions related to the business element are not needed. If a business element's changeability status is "changeable", a user or a process may change the business element's selection status. Otherwise, the selection status of the business element cannot be changed.

Initially, some particular business elements are selected, either by default of by a user's manual selection (via an interface, for example). These initial statuses of some business elements are called initial facts. Based on the initial facts and rules, the ABCS 105 automatically determines what other business elements need to be selected and implemented so that the resulting system is functionally complete with respect to the business requirement. The determinations are sent back to the client-side ERP application 14, which displays each corresponding business elements in a mode according to the determination in a GUI. For example, if a business element's status is determined to be "selected", the business element is displayed by the client-side ERP application 14 in a mode telling a user that the business element is currently selected. The user may manipulate the GUI of the client-side ERP application 14 by selecting or deselecting a business element, therefore triggers the ABCS 105 to determine the consequences of the change of status of the user selected business element. A consequence may be, for example, a change of status of another business element. The consequences are sent back to the client-side ERP application 14 for updating the GUI. Note that some or all of the components as shown in FIG. 1 may be implemented in software, hardware, or a combination of both.

2. Automatic Business Configuration Subsystem

Figure 2:
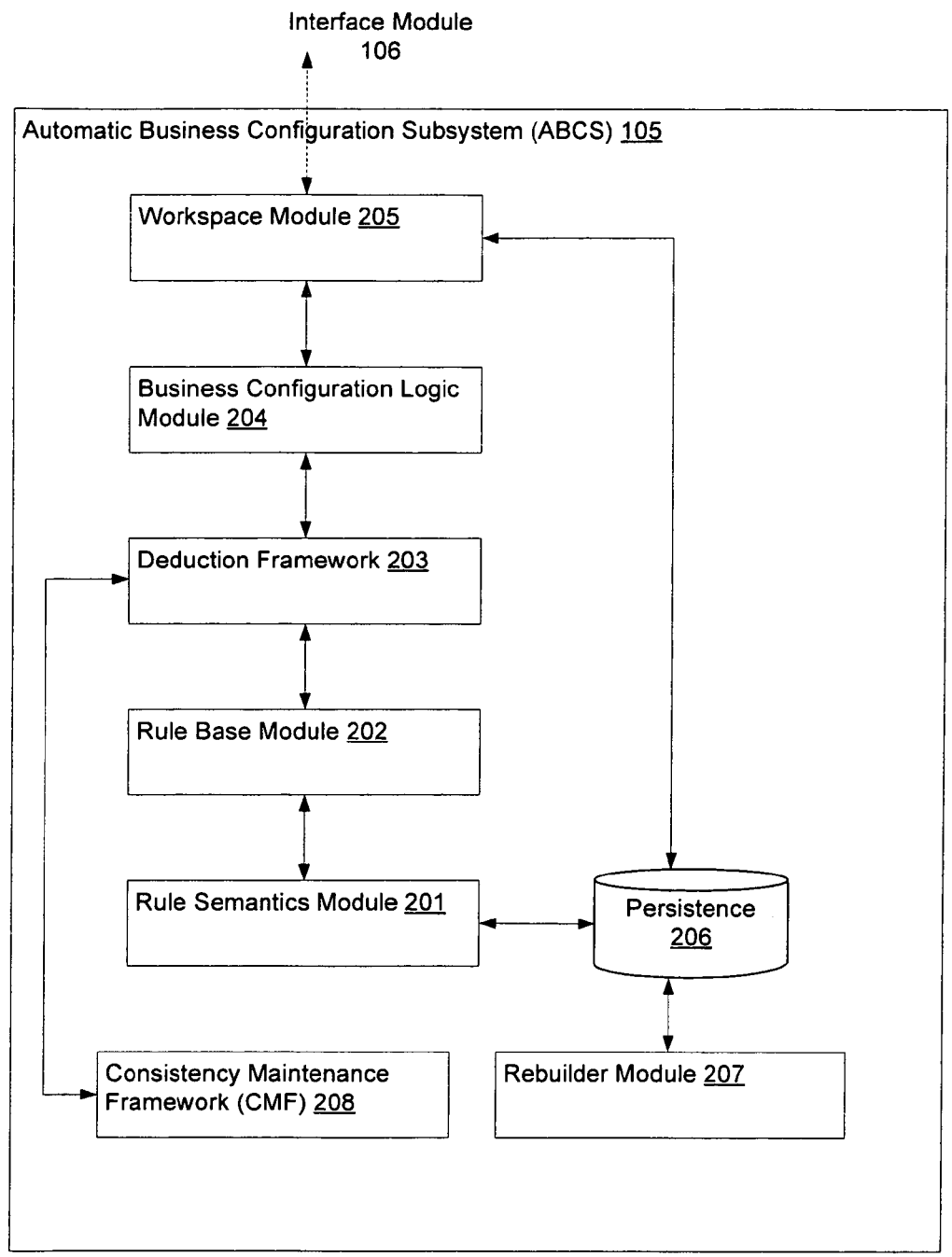
FIG. 2 illustrates an example of an architecture of an Automatic Business Configuration Subsystem (ABCS)

FIG. 2 illustrates an example of an architecture of an automatic business configuration subsystem (ABCS) according to one embodiment. As shown, the ABCS 105 includes a rule semantics module 201. The rule semantics module 201 provides syntax and semantics checks to rules. In one embodiment, a user may input rules into the ERP system 11 via the client-side ERP application 14. The rule semantics module 201 parses the rules, transforms the rules into a unified format, and stores the rules into the persistence 206. When called by the rule base module 202 (introduced below), the rule semantics module 201 retrieves these rules from the persistence 206 and transforms them into in-core rule objects. Here, the term "in-core" means in a main memory of a processing system. The rule semantics module 201 also does redundant and collision checks for the rules stored in the persistence 206. Redundant checks prevent redundant rules in the persistence. Collision checks detect conflicting rules and recursive rules.

The ABCS 105 further includes a rule base module 202. After rules are encapsulated as in-core objects by the rule semantics module 201, the rule base module 202 organizes these objects so that they may be easily accessed or searched by other components.

The deduction framework 203 is the module which handles all different relationships in a scoping process. These relationships may include, but not limited to constraint, pre-selection, prerequisite, etc. The deduction framework 203 may also handle change determination and changeability determination. Change determination refers to determining whether a particular business element's status should be changed, for example, from "selected" to "deselected". Changeability determination refers to determining whether a particular business element's status may currently be changed, for example, from "selected" to "deselected".

The deduction framework 203 triggers the change determination and/or changeability determination functions in response to receiving an asserted fact. An asserted fact refers to a status change of a business element caused by a user's selection or deselection of the business element via the client-side ERP application 14. Note that a fact may also be asserted by a process. The deduction framework 203 matches the asserted fact with the conditions of available rules to determine the consequences. A consequence may be, for example, another business element's status must be changed because of the asserted fact. For example, assuming a rule is specified as "IF X is selected AND Y is selected THEN M is selected". Assuming further that X's current status is "selected", and Y's status has just been changed into "selected" because a user manually selected Y, for example, from a GUI of a client-side ERP application 14. Therefore, M's current status should be "selected" because of the condition of the above rule becomes true.

Because the above reasoning is from a rule's condition to the rule's consequence, it is called forward chaining. Based on the determined consequences, the deduction framework 203 updates the status of each of the affected business elements.

The deduction framework 203 also provides the function of explanation determination. Explanation determination determines and provides reasons of a particular business element's current status, e.g., "selected" or "deselected". For example, if a rule is defined as "IF A is selected THEN B is deselected", then if business element B's current status is "deselected", one of the possible reasons could be that business element A's current status is "selected". As shown in the example, the reasoning is from the consequence to the condition of a rule, thus, it is called backward chaining.

As shown, the ABCS 105 also includes a business configuration logic module 204. The business configuration logic module 204 controls the progress of a scoping process.

The workspace module 205 provides the functionality of maintaining an in-core data structure storing statuses of at least some of the ERP system 11's business elements during a scoping process. The workspace module 205 also provides session and memory management. Session management enables the ERP system 11 to handle multiple scoping processes initiated by multiple users. Memory management provides the function of allocation/deallocation of memory blocks, storing data from a workspace instance into the persistence 206, and reading data from the persistence 206 into a workspace instance. For example, after a status of a business element is changed by the deduction framework 203, the workspace module 205 may update the status of the business element stored in the persistence 206.

The ABCS 105 may include a rebuilder module 207. At a certain point of a user's scoping process, the rebuilder module 207 provides the function to enable the user to save the current scoping process as image data in the persistence 206 or a different database. Later, upon the user's request, the rebuilder module 207 may rebuild the scoping process into memory from the image data saved in the persistence 206 so that the user may continue the scoping process from the point where it is saved.

The Consistency Maintenance Framework (CMF) module 208 detects inconsistencies of some business elements' statuses and provides solutions to solve these inconsistencies. An inconsistency may be caused by different reasons. For example, after a business element's status is fixed, a rule is changed. A consequence of the change is that the business element's status must be changed. Thus, the rule change causes a collision (i.e., an inconsistency). Another example, when two developers are working on different aspect of a same scoping project, their workspaces need to be merged into a final workspace. An assumption is that both of their works are based on a same set of rules. However, during the merge, a same business element may have two different statuses. Thus, the merge causes a collision.

In one embodiment, the CMF module 208 receives a set of rules and statuses of a set of business elements. The CMF module 208 automatically detects all of the collisions and proposes solutions of solving the collisions. Note that some or all of the components shown in FIG. 2 may be implemented in software, hardware, or a combination of the both.

2.1 Rule Semantics Module

The rule semantics module 201 provides syntax and semantics checks to various types of rules. The rule semantics module 201 parses these rules, transforms them into and stores them into the persistence 206. When called by the rule base module 202, the rule semantics module 201 retrieves these rules from the persistence 206 and transforms them into in-core objects.

Rules are associated with business elements, and a rule can change the status of the associated business element. The rule semantics module 201 parses a rule according to rule grammars predefined. Rule grammars are presented using grammar productions. FIG. 3a illustrates an example of a set of rule grammars according to one embodiment. Each grammar production defines a non-terminal symbol and the possible expansions of that non-terminal symbol into sequences of non-terminal or terminal symbols. In grammar productions, non-terminal symbols are shown in italic, type, and terminal symbols are shown in a bold font. As shown, column 301 lists the names to be defined and column 302 lists the corresponding definitions. For example, constraint rule is defined as

```
IF Conditional-Expression THEN Consequence-Statement
IF Conditional-Expression THEN To-Be-Select-Statement ELSE
To-Be-Deselect-Statement
IF Conditional-Expression THEN To-Be-Select-Statement ELSE
IF Conditional-Statement THEN
To-Be-Deselect-Statement.
```

In one embodiment, the rule grammars are specified by a user via an interface. These specified grammars may be stored in a database (the persistence 206, for example). When the system is initialized, these specified grammars are read from the database and presented as in-core grammar objects. The rule semantics module 201 uses these in-core grammar objects to parse a rule.

Figure 3B:
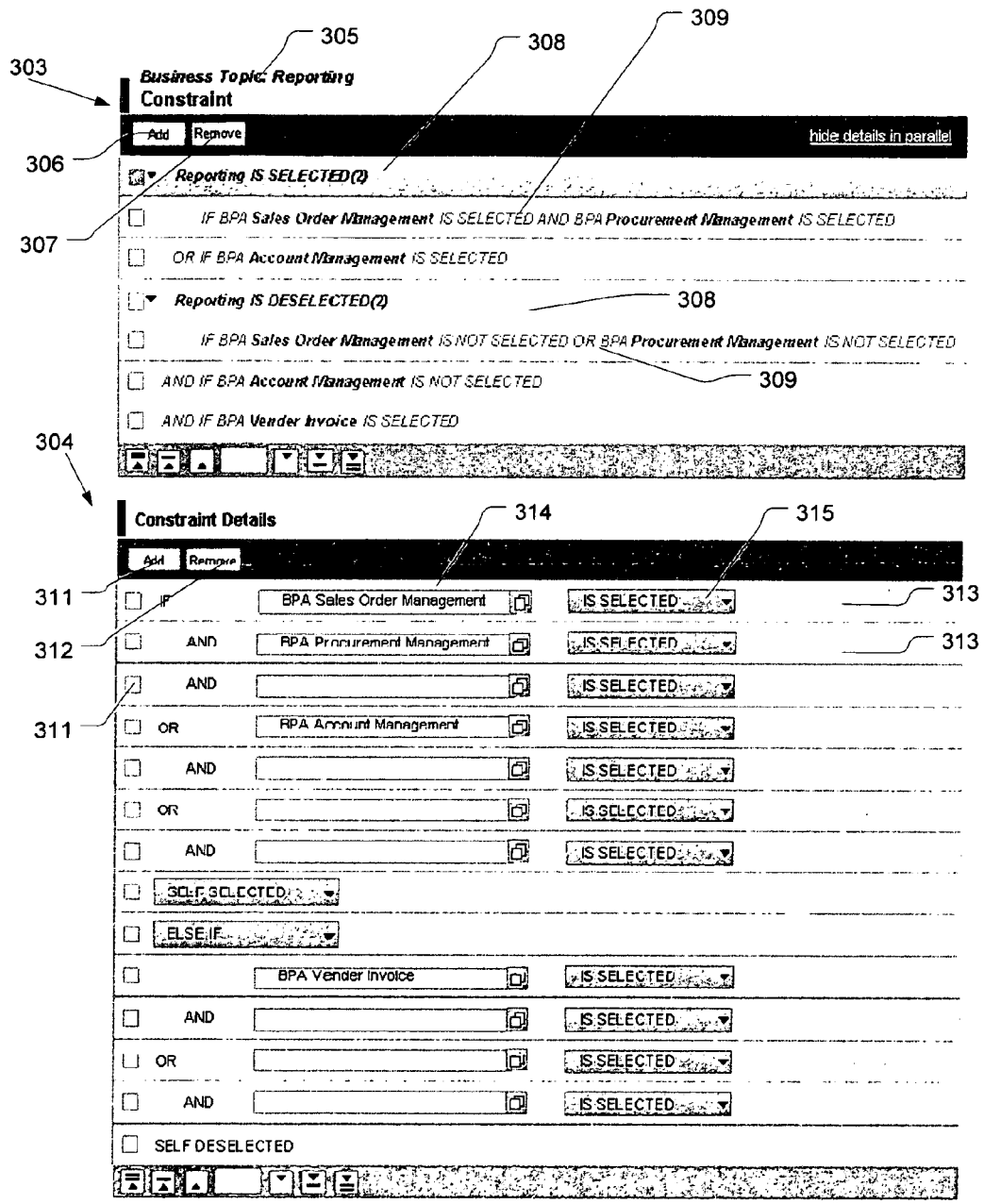
FIG. 3b illustrates an example of a Graphic User Interface (GUI) through which a user may input a rule into an ERP system according to one embodiment.

In one embodiment, a user may input rules into the ERP system 11 via the client-side ERP application 14. The rule semantics module 201 parses the rules, transforms the rules into a unified format, and stores the rules into the persistence 206. FIG. 3b illustrates an example of a Graphic User Interface (GUI) through which a user may input a rule into an ERP system such as system 11. As shown, the GUI has a brief section 303 and a detailed section 304. The title 305 of the brief section 303 indicates the business element with which the current GUI is concerned. The brief section 303 provides a button 306 for adding a new rule for the business element and a button 307 for removing a rule already created for the business element. The dropdown list 308 allows a user to choose a consequence of a rule, and the GUI component 309 shows the condition of the rule. A user may check the checkbox 310 shown in front of the dropdown list 308 and click on the remove button 307 to remove the rule. A user may also click on the dropdown list 308 to highlight the rule to display it in the detailed section 304.

The detailed section 304 displays the rule selected in the brief section 303. The detailed section 304 displays the selected rule in multiple rule sections 313, each section 313 representing a singular condition. Additionally, the detailed section 304 provides a button 311 for adding a new rule section 313 and a button 312 to remove a selected existing rule section 313. Within each rule section 313, there is a GUI component 314 allowing a user to select another business element and a dropdown list 315 to select a status for the selected another business element. There is also a check box 316 within the rule section 313. A user may check the check box 316 for removal. Note that GUI as shown in FIG. 3b is described for illustration purposes only. Other configuration or layouts may also be applied.

2.2 Rule Base Module

Figure 4:
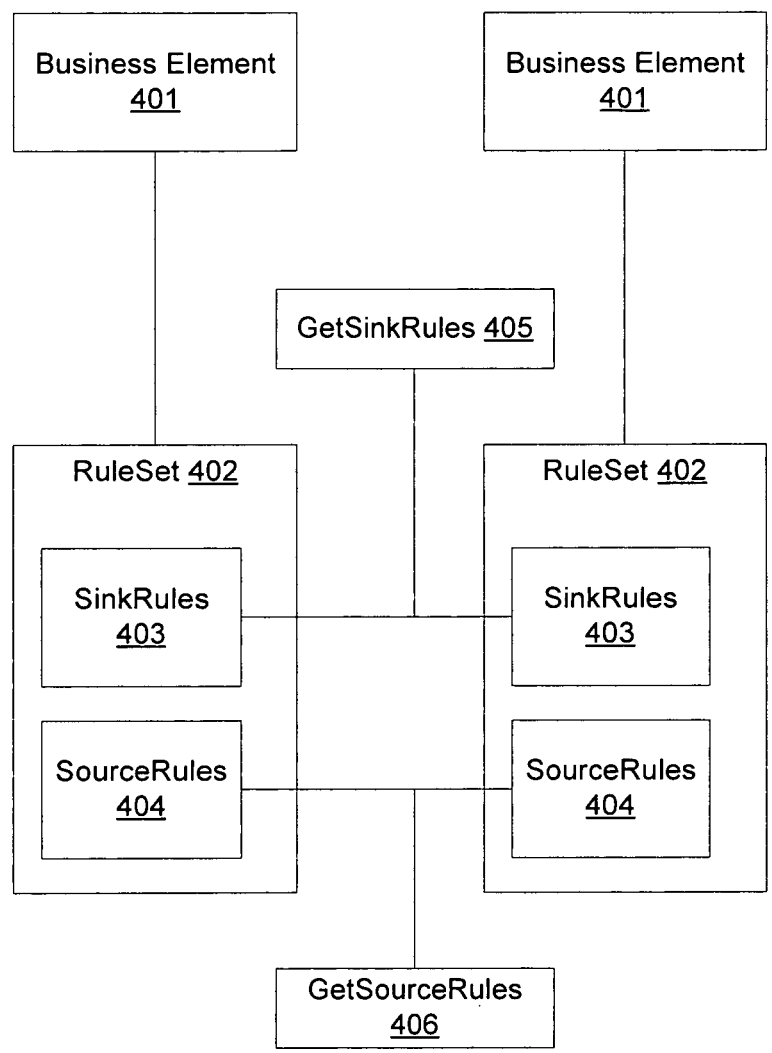
FIG. 4 is a block diagram illustrating an instance of the rule base module in memory according to one embodiment.

As introduced above, the rule base module 202 (shown in FIG. 2) organizes all rules as objects in memory for quick access. FIG. 4 is a block diagram illustrating an instance of the rule base module in memory according to one embodiment. As shown, each business element 401 is associated with a RuleSet object 402. If an element 401 is a rule's condition, then the rule is the element's sink rule. If the element 401 is a rule's consequence, then the rule is the element's source rule. Thus, the RuleSet object 402 may include a SinkRules object 403 containing a set of the element's sink rules and a SourceRules object 404 containing a set of the element's source rules. Other components can get an element's sink rules and/or source rules by calling the getSinkRules interface 405 and/or the getSourceRules interface 406 with the element's ID.

Figure 5:
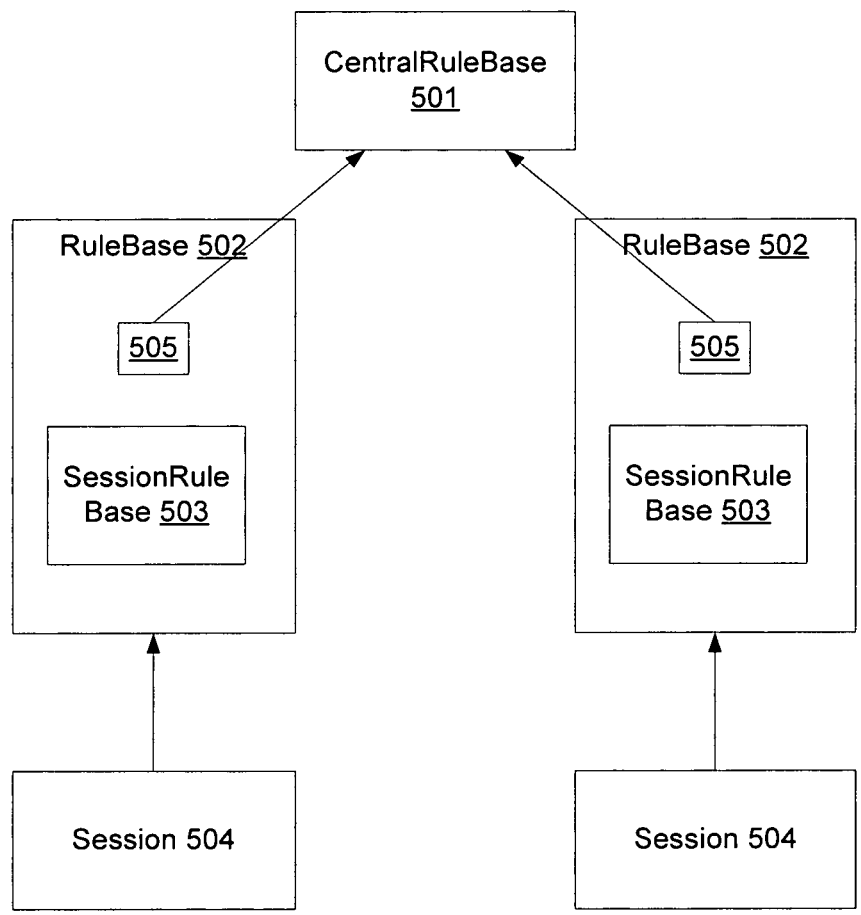
FIG. 5 illustrates a mechanism to reduce a memory size consumed by multiple instances of the rule base module for supporting multiple users/developers according to one embodiment.

FIG. 5 illustrates a mechanism to reduce a memory size consumed by multiple instances of the rule base module for supporting multiple users/developers according to one embodiment. As shown, each session 504 has a RuleBase object 502. Each RuleBase object 502 has a SessionRuleBase object 503 and a reference 505 referring to a CentralRuleBase object 501. The CentralRuleBase object 501 is shared by more than one sessions 504. In one embodiment, each of the references 505 is a pointer pointing to the shared CentralRuleBase object 501. SessionRuleBase 503 is independent from the CentralRuleBase 501 and is only available for the particular working memory instance 503.

Because CentralRuleBase object 501 is shared in memory, more than one user can do operations on it at the same time. When any user wants to read from or write to the CentralRuleBase object 501, the user should check whether the CentralRuleBase object 501 is locked by any other user. If the CentralRuleBase object 501 is locked by another user, the user should wait until the CentralRuleBase object 501 is unlocked.

2.3 Deduction Framework

Figure 6:
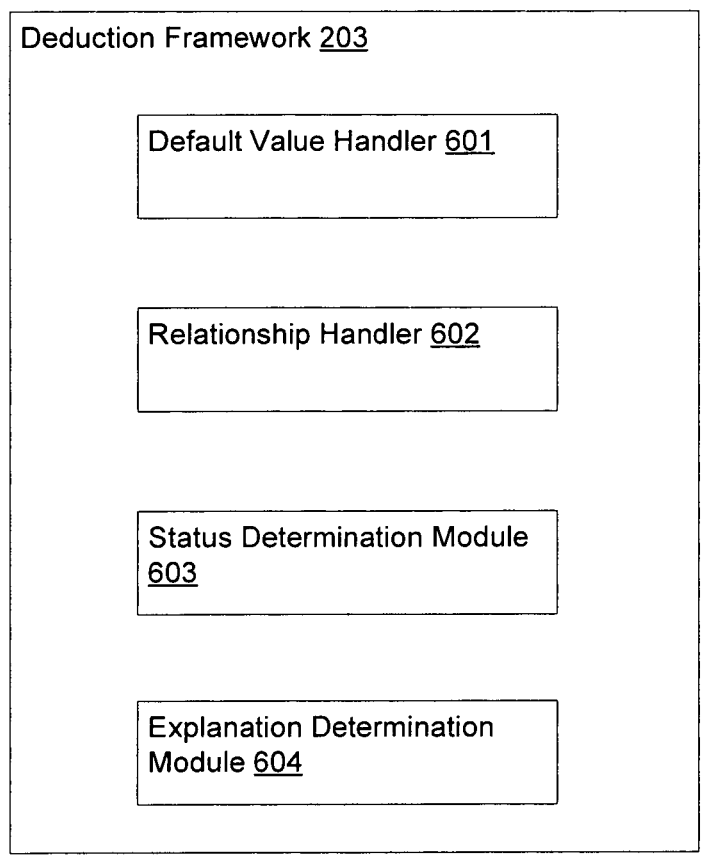
FIG. 6 illustrates an example of an architecture of a deduction framework according to one embodiment.

The deduction framework 203 is the module which handles all different relationships in a scoping process. FIG. 6 illustrates an example of an architecture of a deduction framework according to one embodiment. As shown, the deduction framework 203 includes a default value handler 601, a relationship handler 602, a status determination module 603, and an explanation determination module 604.

The default value handler 601 manages default values for business elements. Default value defines the initial value (i.e., "selected" or "deselected") of a business element. Default value is often set for high level business elements (business packages, for example). In general, the default value of all business elements is "deselected". A user can optionally define a rule to set the default value to be "selected".

In an embodiment, defaults are effective only if there is no other value source setting the status of a business element. For example, assuming business topic "Pricing" is selected, but no business option of "Pricing" has been selected yet. In this case the system evaluates the default rules of the business options of "Pricing" and selects one or more business options. Value source is defined as the source that causes the change of a business element's status. In one embodiment, a value source may be Constraint, Manual Selection, Pre-selection, Default, and Prerequisite. In many cases, a business element's status change may be caused by more than one value sources. The priority of these value sources from high to low in resolving a conflict may be Constraint, Manual Selection, Pre-selection, Default, and Prerequisite. Defaults can be overwritten by Constraints, Pre-selection, and Manual Selection.

The relationship handler 602 handles various relationships among business elements. These relationships may be a prerequisite relationship, a pre-selection relationship, a constraint, etc. Prerequisite is a bottom-up relationship between business elements according to the hierarchy. Prerequisite means, if a child business element is selected then its direct parent business element is selected automatically and if a parent business element is deselected then all its child business elements are deselected.

If a system selects a business element automatically because of prerequisite then this business element inherits the value source of its child-node. Prerequisites are always effective and can not be overruled by other value sources.

Constraints represent the dependency relationships that exist among various business elements. There are "to-be-selected" and "to-be-deselected" constraints. Constraints are implemented by rules. There is only one constraint rule for one business element by using "ELSE" or "ELSE IF" statement.

The status determination module 603 determines a business element's actual status based on the value set by various different value sources and the priorities associated with these sources. In one embodiment, the priority from high to low in resolving a conflict may be constraint, manual selection, pre-selection, default, and prerequisite. A value set by a higher priority value source overrides a value set by a lower priority value source. For example, if a Constraint rule set a business element's value as "deselected", while a Manual Input set the business element's value as "selected", the actual status of the business element is "deselected". As a result, if a constraint sets a business element's status, the business element's status will be unchangeable, until the constraint is removed. In one embodiment, if there is a constraint setting a business option to be "deselected", the relevant business option will be invisible until the constraint is removed.

The explanation determination module 604 determines the originator of a business element's current status. Originator is a business element which is the initial cause of an associated business element's status. By modifying the originator's status, the constraint can be removed from the associated business element. Thus, the explanation determination module 604 provides a developer not only an explanation of why the associated business element has the current status but also a solution of unlock the status of the associated business element. For example, if there are two business elements X and Y, and the rule is that "IF X is selected THEN Y is selected." Initially, both X and Y are not selected but changeable. Assuming X is selected, the result will be Y is selected and Y is not changeable. In this example, a user might want to deselect Y, but this operation is not possible because of Y's changeability is "No". However, the user may choose to list all of Y's originator(s). The originator in this case is X. The user may deselect X so that Y's status may be changeable. It is possible to have multiple originators for one business element. The explanation determination module 604 can find out all the originators and the paths leading to the business element's current status.

2.4 Consistency Maintenance Framework (CMF)

Figure 7:
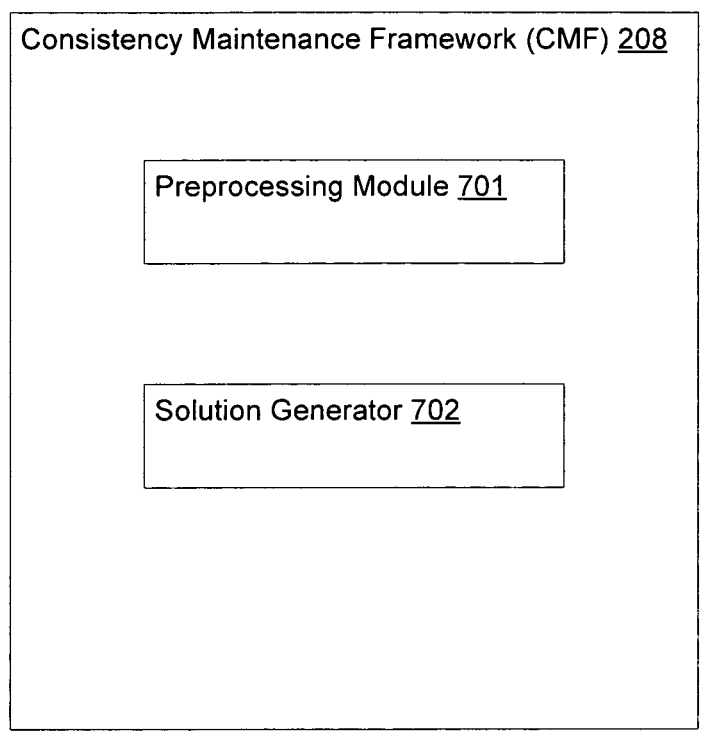
FIG. 7 illustrates an example of an architecture of the Consistency Maintenance Framework (DMF) according to one embodiment.

As introduced above, the Consistency Maintenance Framework (CMF) module 208 detects inconsistencies of some business elements' statuses and provides solutions to solve these inconsistencies. FIG. 7 illustrates an example of an architecture of the Consistency Maintenance Framework (DMF) according to one embodiment. As shown, the CMF 208 includes a preprocessing module 701 and a solution generator 702.

The preprocessing module 701 receives a set of rules and a set of business elements. The preprocessing module 701 creates data elements that may be processed by the solution generator 702 based on these rules and business elements. Among these business elements, some business elements' statuses are ascertained. In other words, these business elements' statuses have been verified or confirmed to be correct. Such statuses are called ascertained statuses and may be used as the basis to detect inconsistency.

In one embodiment, the preprocessing module 701 creates a data element called node for each business element. A node is a fact with defined value of true or false. For example, if business element A's status is "selected", a node A=1 ("1" representing true) is created, assuming "selected" status is true. The preprocessing module 701 processes all of the business elements of an ERP system and creates a set to include all of the nodes created. Such a set is called the universal node set. For example, assuming there are four business elements, A, B, C, and D. Further assuming A's status is "selected", B's status is "selected", C's status is "deselected" and D's status is "deselected". Then, the universal node set would be {A=1, B=1, C=0, D=0}.

The preprocessing module 701 creates a set of nogoods based on a set of rules. A nogood is a set of nodes, which cannot exist simultaneously (or be coexistent). For example, if a rule is specified as "IF A is selected THEN B is selected". Based on the rule, a nogood {A=1, B=0} is created, meaning that the situation, in which A is selected, B is deselected, should not occur. If a nogood is a subset of the universal node set, then it means that the universal node set is not consistent. As a result, the statuses of the business elements of an ERP system are inconsistent, either.

In one embodiment, the preprocessing module 701 is implemented as an Assumption-based Truth Maintenance System (ATMS). However, a person of ordinary skill in the art would appreciate that other Truth Maintenance System (TMS) may also be used in implementing the preprocessing module 701.

The solution generator 702 receives these data elements from the preprocessing module 701, determines whether the statuses of the business elements are consistent with each other, and finds a solution to solve any inconsistency if any. In one embodiment, the goal of the solution generator 702 is to find a solution which requires changing the least number of business elements' statuses. Thus, the solution generator 702 needs to find the business element, whose status together with other business element(s)'s status(es) violate the most number of rules. For example, assuming business element A's status is "selected" and B's status is "deselected", A and B's statuses violate the rule "IF A is selected THEN B is selected". The solution generator 702 then changes the business element's status so that statuses of all business elements are becoming less inconsistent. The solution generator 702 reiterates the above steps until the statuses of all business elements do not violate any of the rules.

In one embodiment, the solution generator 702 also provides user friendly explanations for a developer to help the developer solve the inconsistencies more quickly.

3. Processing Flows

Figure 8:
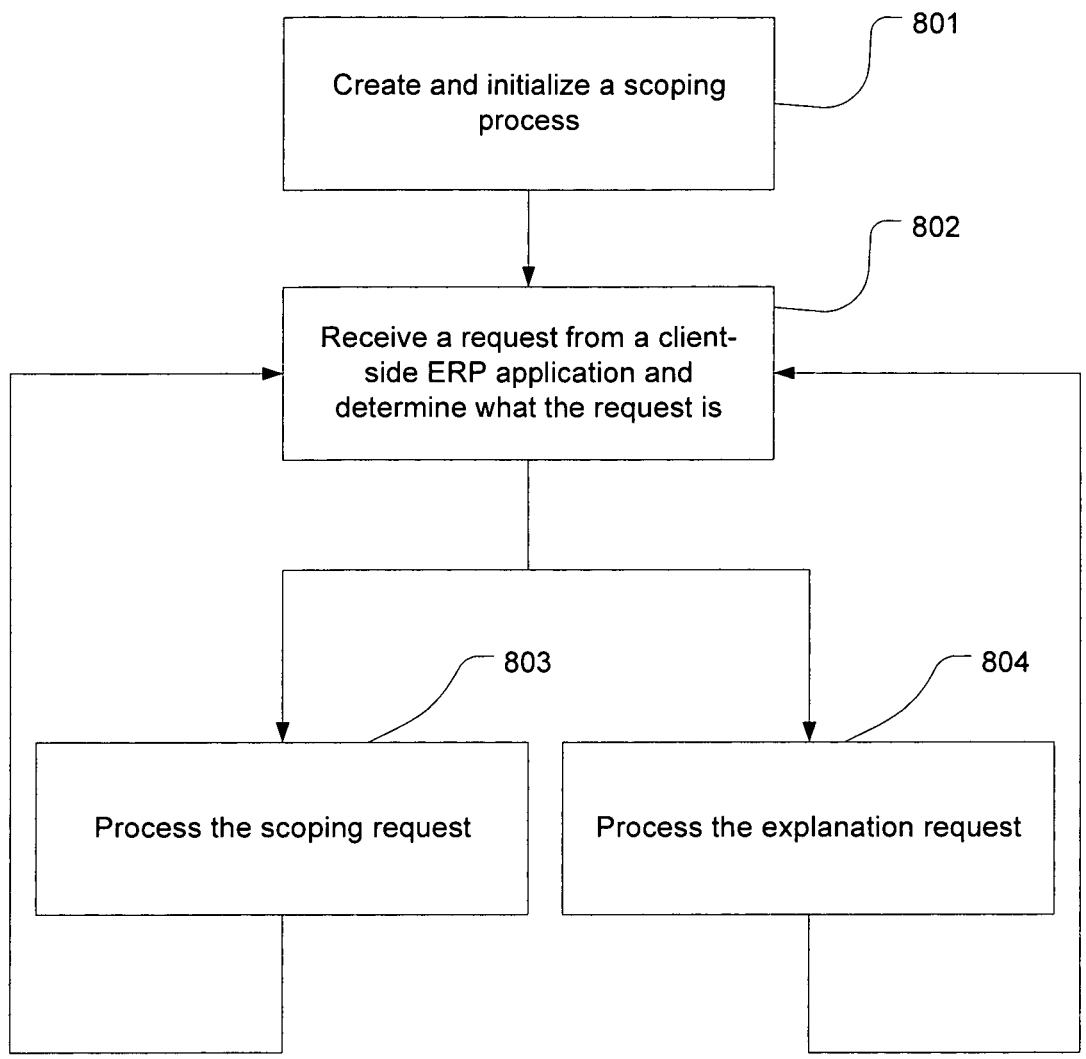
FIG. 8 is a flow diagram illustrating an example of a scoping process according to one embodiment.

FIG. 8 is a flow diagram illustrating an example of a scoping process according to one embodiment. Note that process of FIG. 8 may be performed by processing logic which may include software, hardware, or a combination of both. At block 801, a new scoping process is created and initialized. A scoping process may be created by a user via a GUI of the client-side ERP application 14. For example, the GUI may provide a button or a menu option allowing a user to new a scoping process.

At block 802, the ABCS 105 of the ERP system 11 receives a request from the client-side ERP application 14. The ABCS 105 determines what the request is. If the request is a scoping request, the flow goes to block 803. If the request is for an explanation of a business element's current status, the flow goes to block 804.

At block 803, the ABCS 105 processes the scoping request. A scoping request may be triggered by a user asserting a fact. A fact may be asserted when a user choose to select or deselect a business element, such as a business option, via a GUI of the client-side ERP application 14. After the scoping request is processed, the flow goes back to block 802 to wait for a new request.

At block 804, the ABCS 105 receives an explanation request regarding a business element's current status. An explanation request may be triggered by a user choosing a business element and clicking a button or a menu option for explanation of the chosen business element's current status via a GUI of the client-side ERP application 14. The ABCS 105 determines the originator(s) of the business element's current status and sends the information to the client-side ERP application 14. After the explanation request is processed, the flow goes back to block 802 to wait for a new request.

Figure 9A:
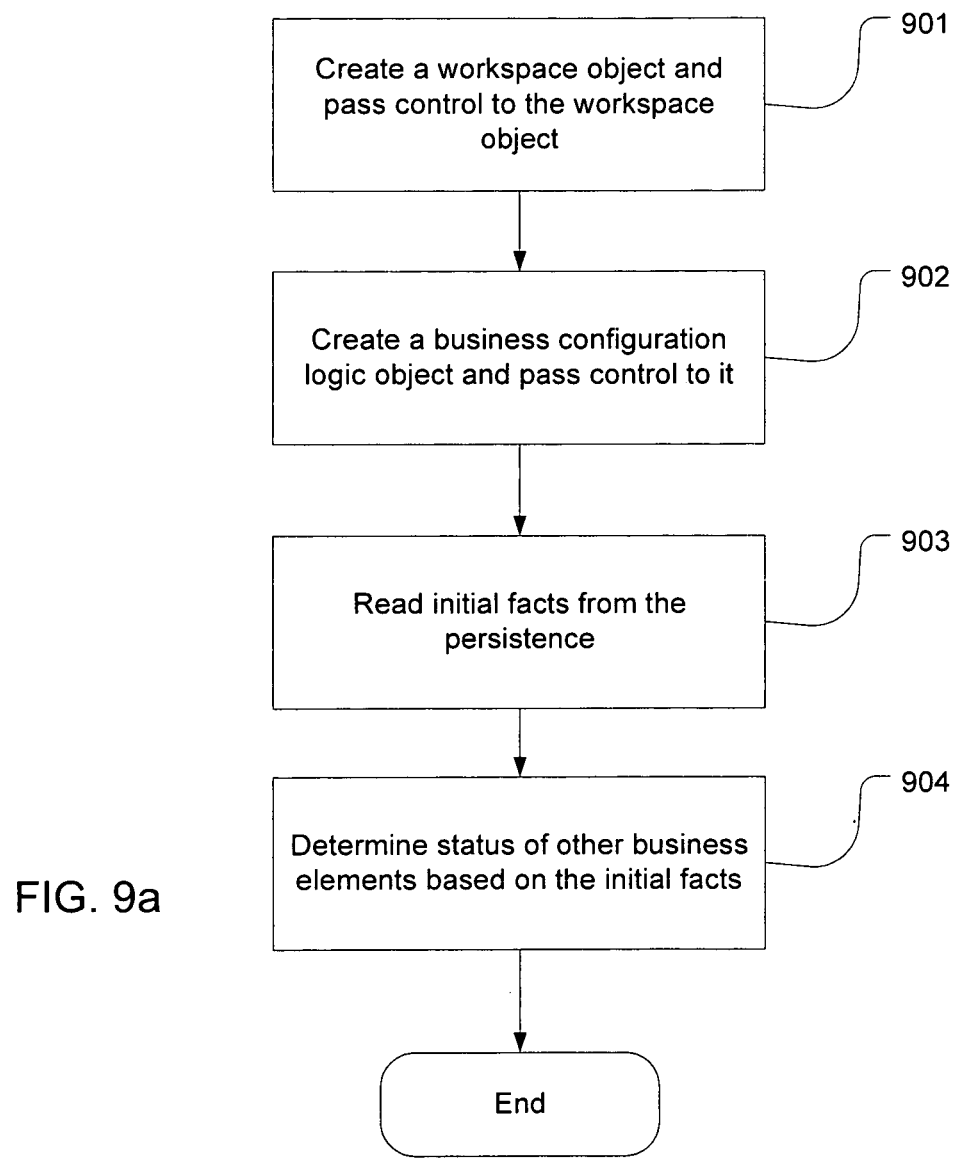
FIG. 9a is a flow diagram illustrating a scoping process according to an alternative embodiment.

FIG. 9*a* is a flow diagram illustrating a scoping process according to an alternative embodiment. For example, process of FIG. 9 may be performed as a part of block 801 of FIG. 8. At block 901, the ABCS 105 creates a workspace object (an instance of the workspace module 205) for the particular user and gives the control to the workspace object. The workspace object organizes the session and memory space of the current scoping process initiated and controlled by the particular user. It also provides an interface through which the client-side ERP application 14 can communicate and/or control with the scoping process.

At block 902, the workspace object creates a business configuration logic object (an instance of the business configuration logic module 204) and transfers control to it. As discussed above, the business configuration logic module 204 implements the logic of controlling a scoping process. After the business configuration logic object receives control from the workspace object, it creates a rule base object (an instance of the rule base module 202) and initializes it. In one embodiment, the rule base module 202 provides the function of creating a CentralRuleBase object which organizes all rules that are shared across multiple user sessions, and a SessionRuleBase object which is specific to a particular user session. The CentralRuleBase object is created and initialized only one time. During the CentralRuleBase object's initialization, the CentralRuleBase object creates an instance of the rule semantics module 201, which reads rules from the persistence 206 and encapsulates them as in-core rule objects. In the beginning, the SessionRuleBase object does not contain any user session specific rules. However, with the progress of a scoping process, user session specific rules will be read from the persistence 206 via an instance of the rule semantics module 201.

At block 903, the business configuration logic object reads initial facts from the persistence 206. In one embodiment, initial facts are default values of some of the ERP system 11's business elements. After receiving the initial facts, the business configuration logic object calls an instance of the deduction framework module 203 to determine the statuses of other business elements.

At block 904, the instance of the deduction framework module 203 determines other business elements' statuses based on the initial facts. These statuses are sent back to the client-side ERP application 14. If a business element's status is "selected", the client-side ERP application 14 will display the business element as selected. If a business element's status is "deselected", the client-side ERP application 14 will display it as deselected. If a business element's changeability is "No" (meaning the business element's status cannot be changed at the moment), the client-side ERP application 14 will either hide it or display it in a mode a user cannot select or deselect it.

FIG. 9*b* is a flow diagram illustrating a scoping process according to another embodiment. For example, the process of FIG. 9*b* may be performed as a part of block 803 of FIG. 8. At block 911, a scoping request is received by the ABCS 105. In one embodiment, the ABCS 105 receives the scoping request via a workspace object binding with a client-side ERP application 14. A user may select or deselect a particular business element via a GUI provided by the client-side ERP application and triggers a scoping request. The scoping request may include an asserted fact. Alternatively, the asserted fact may be sent to the ABCS 105 separately from the scoping request.

At block 912, the business configuration logic object created during initialization receives the asserted fact from the workspace object and calls an instance of the deduction framework module 203.

At block 913, the instance of the deduction framework module 203 determines the consequences of the asserted fact. A consequence may be, for example, a change of status of a business element. Then, these consequences are sent back to the client-side ERP application 14.

FIG. 9c is a flow diagram illustrating a scoping process according to another embodiment. For example, the process of FIG. 9b may be performed as a part of block 804 of FIG. 8. At block 921, the ABCS 105 receives an explanation request regarding a business element. At block 922, the business configuration logic object created during initialization receives the explanation request and the identity of the business element. The business configuration logic object calls the instance of the deduction framework module 203. At block 923, the instance of the deduction framework module 203 determines the originators of the current status of the business element, composes explanations, and sends the explanations back to the client-side ERP application 14.

Figure 10:
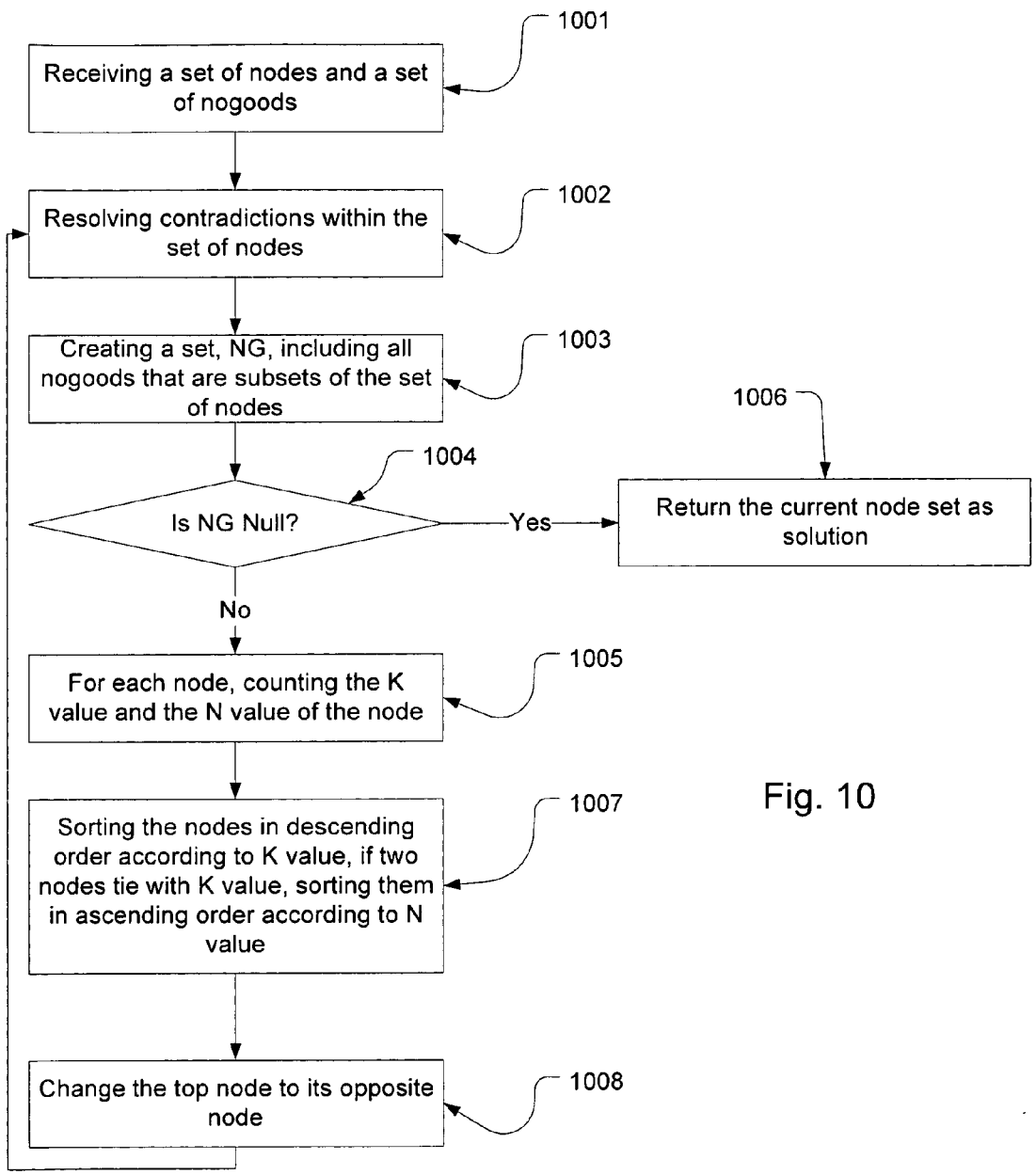
FIG. 10 is a flow diagram illustrating a process of a solution generator according to one embodiment.

FIG. 10 is a flow diagram illustrating a process of a solution generator according to one embodiment. For example, the process may be performed by processing logic as shown in FIG. 7. As discussed above, the goal of the solution generator 702 is to find a solution which requires changing the least number of business elements' statuses. Thus, the solution generator 702 needs to find the business element, whose status together with other business element(s)'s status(es) violate the most number of rules. The solution generator 702 then changes the business element's status so that statuses of all business elements are becoming less inconsistent. The solution generator 702 reiterates the above steps until the statuses of all business elements do not violate any of the rules.

It is assumed that the preprocessing module 701 has already created a universal node set based on statuses of a set of business elements and created a set of nogoods based on all the rules. For example, assuming an ERP system has three business elements A, B, and C, and the ERP system has three rules restricting the three elements: "IF A is selected THEN B is selected", "IF B is selected THEN C is selected", and "IF A is deselected THEN B is deselected". Further assuming the default statuses of A, B, and C are respectively "selected", "deselected", and "deselected". Thus, the universal node set is {A=1, B=0, C=0}. The set of nogoods are {A=1, B=0}, {B=1, C=0}, {A=0, B=1}, and {A=1, C=0}. This example is continued as the process of FIG. 10 is further illustrated below.

At block 1001, the solution generator 702 receives the universal node set and the set of nogoods.

At block 1002, the solution generator 702 resolves all contradictions within the node set. A contradiction may occur if a node is not allowed. For example, if "business element A must be selected" is an ascertained fact, then node A=0 must be changed to node A=1.

At block 1003, the solution generator 702 creates a set, NG, including all nogoods that are subsets of the universal node set. Continuing the example above, because nogoods {A=1, B=0}, {A=1, C=0} are subsets of the universal node set {A=1, B=0, C=0}, NG is {{A=1, B=0}, {A=1, C=0}}.

At block 1004, the solution generator 702 determines whether the NG set is Null, meaning no nogood is a subset of the universal node set. If the NG set is Null, at block 1005, a K value and an H value of each node of the universal node set are counted. The K value is the number of times a node appears in the NG set. The H value is the number of times the opposite node of the node appears in the whole set of nogoods. A node and its opposite node have opposite values regarding a same business element. For example, node A=1's opposite node is A=0. In the above example, the K values for A, B, and C respectively are 2, 1, and 1. The H value for A, B, and C respectively are 0, 2, and 0.

However, if the NG set is Null, at block 1006, the current universal node set is returned as the solution.

At block 1007, the solution generator 702 sorts the nodes in descending order according to K value. If two nodes tie with their K value, the solution generator 702 sorts them in ascending order according to their N value. In the above example, the result of the sort is A, C, B.

At block 1008, the solution generator 702 replaces the top node in the universal node set with its opposite node. After block 1008, the process goes back to block 1002. In the above example, A=0 replaces A=1 in the universal node set {A=1, B=0, C=0}. Thus, the universal node set becomes {A=0, B=0, C=0}. During the second round process, the NG set is Null. Then, the universal node set {A=0, B=0, C=0} is returned as a solution.

Figure 11:
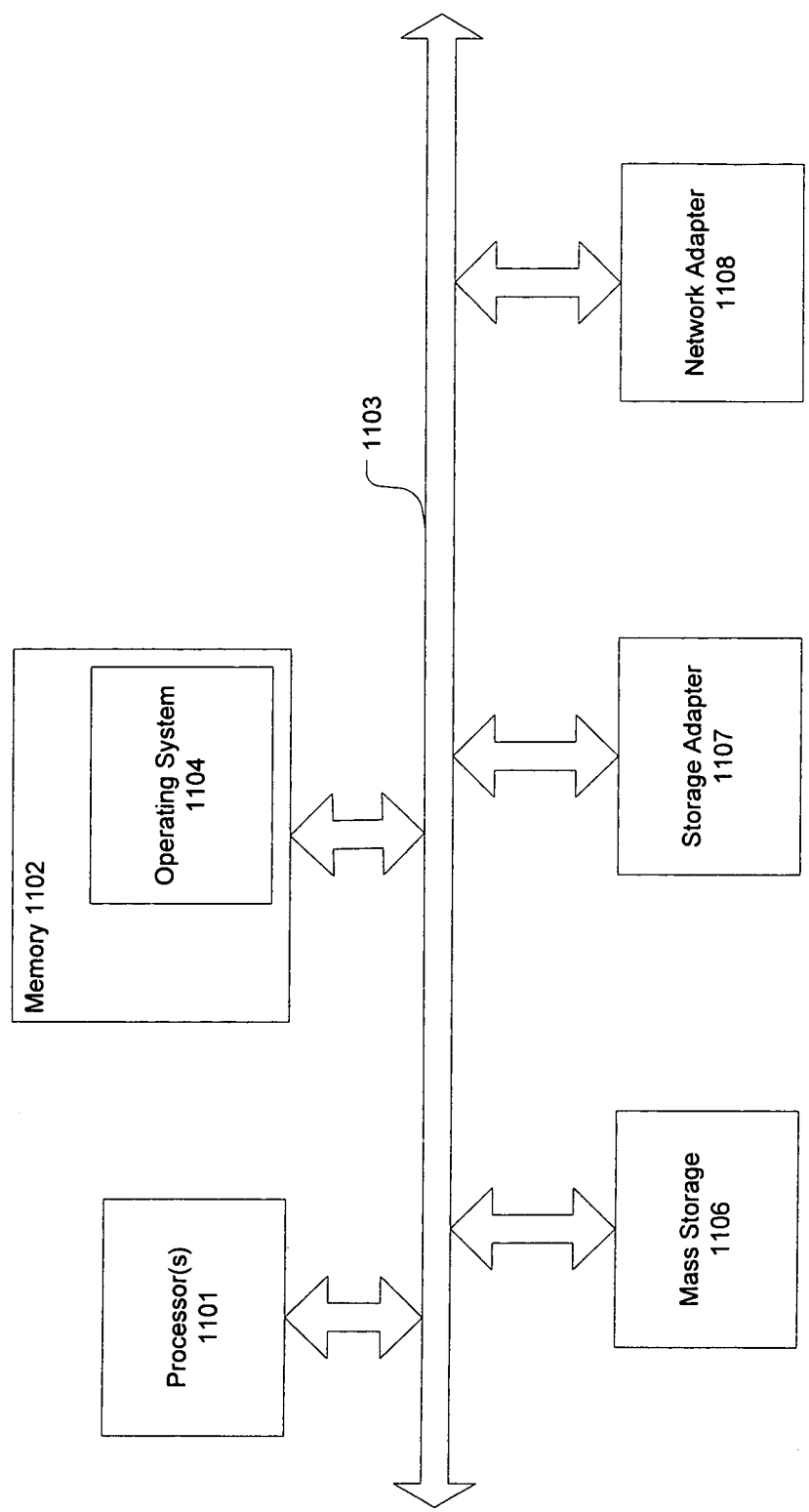
FIG. 11 is a block diagram showing an example of a processing system.

FIG. 11 is a block diagram showing an example of a data processing system that may be used with one embodiment of the invention. The hardware architecture may apply to both the clients 12 and/or the ERP system 11 of FIG. 1. Certain standard and well-known components which are not germane to the present invention are not shown. The processing system includes one or more processors 1101 coupled to a bus system 1103.

The bus system 1103 in FIG. 3 is an abstraction that represents any one or more separate physical buses and/or point-to-point connections, connected by appropriate bridges, adapters and/or controllers. The bus system 1103, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire"). The processors 1101 are the central processing units (CPUs) of the processing system and, thus, control the overall operation of the processing system. In certain embodiments, the processors 1101 accomplish this by executing software stored in memory 1102. A processor 1101 may be, or may include, one or more programmable general-purpose or special-purpose microprocessors, digital signal processors (DSPs), programmable controllers, application specific integrated circuits (ASICs), field-programmable gate arrays (FPGAs), programmable logic devices (PLDs), or the like, or a combination of such devices.

The processing system also includes memory 1102 coupled to the bus system 43. The memory 1102 represents any form of random access memory (RAM), read-only memory (ROM), flash memory, or a combination thereof. Memory 1102 stores, among other things, the operating system 1104 of processing system.

Also connected to the processors 1101 through the bus system 1103 are a mass storage device 1106, a storage adapter 1107, and a network adapter 1108. Mass storage device 1106 may be or include any conventional medium for storing large quantities of data in a non-volatile manner, such as one or more disks. The storage adapter 1107 allows the processing system to access a storage subsystem and may be, for example, a Fibre Channel adapter or a SCSI adapter. The network adapter 1108 provides the processing system with the ability to communicate with remote devices over a network and may be, for example, an Ethernet adapter or a Fibre Channel adapter.

Memory 1102 and mass storage device 1106 store software instructions and/or data, which may include instructions and/or data used to implement the techniques introduced here.

Thus, a method and system for automatically configuring an Enterprise Resource Planning (ERP) system have been described.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.)), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

It is believed that processes taught by the discussion above may also be described in source level program code in various object-orientated or non-object-orientated computer programming languages (e.g., Java, C#, VB, Python, C, C++, J#, APL, Cobol, ABAP, Fortran, Pascal, Perl, etc.) supported by various software development frameworks (e.g., Microsoft Corporation's NET, Mono, Java, Oracle Corporation's Fusion, etc.). The source level program code may be converted into an intermediate form of program code (such as Java byte code, Microsoft Intermediate Language, etc.) that is understandable to an abstract execution environment (e.g., a Java Virtual Machine, a Common Language Runtime, a high-level language virtual machine, an interpreter, etc.), or a more specific form of program code that is targeted for a specific processor.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

"Logic", as is used herein, may include, for example, software, hardware and/or combinations of hardware and software.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
   maintaining a plurality of business elements, each of the plurality of business elements being assigned with at least one of a plurality of statuses comprising a selection status and a changeability status, wherein at least one of the plurality of business elements comprise at least one business package, wherein the at least one business package comprises at least one business option;
   maintaining a plurality of rules, wherein each of the plurality of rules specifies at least one of a plurality of semantic relationships between at least two of the plurality of business elements;
   determining whether the at least one of the plurality of statuses of the plurality of business elements are consistent with each other based on the at least one of the plurality of semantic relationships among the plurality of business elements and whether the at least one of the plurality of statuses of the plurality of business elements violate at least one of the plurality of rules; and
   generating a solution to solve an inconsistency, when the at least one of the plurality of statuses of the plurality of business elements are inconsistent,
   wherein at least one of the maintaining the plurality of business elements, the maintaining the plurality of rules, the determining, and the generating are implemented on at least one processor.

2. The method of claim 1, wherein automatically generating a solution to solve the inconsistency comprises:
   identifying a business element from the plurality of business elements, the business element's status violating a predetermined number of rules of the plurality of rules; and
   changing the business element's status.

3. The method of claim 2, wherein a business element's status is considered as violating a rule if the business element's status together with at least one other business element's status contradict with the rule.

4. The method of claim 1, wherein the status is either a "selected" status or a "deselected" status.

5. A non-transitory machine-readable medium having instructions, when executed, cause a machine to perform a method, the method comprising:
   maintaining a plurality of business elements, each of the plurality of business elements being assigned with at least one of a plurality of statuses comprising a selection status and a changeability status, wherein at least one of the plurality of business elements comprises at least one business package, wherein the at least one business package comprising at least one business option;
   maintaining a plurality of rules, wherein each of the plurality of rules specifies at least one of a plurality of semantic relationships between at least two of the plurality of business elements;
   determining whether the at least one of the plurality of statuses of the plurality of business elements are consistent with each other based on the at least one of the plurality semantic relationships among the plurality of business elements and whether the at least one of the plurality of statuses of the plurality of business elements violate at least one of the plurality of rules; and generating a solution to solve an inconsistency, when the at least one of the plurality of statuses of the plurality of business elements are inconsistent.

6. The non-transitory machine-readable medium of claim 5, wherein automatically generating a solution to solve the inconsistency comprises:
identifying a business element from the plurality of business elements, the business element's status violating a predetermined number of rules of the plurality of rules; and
changing the business element's status.

7. The non-transitory machine-readable medium of claim 6, wherein a business element's status is considered as violating a rule if the business element's status together with at least one other business element's status contradict with the rule.

8. The non-transitory machine-readable medium of claim 5, wherein the selection status comprises a selected status or a deselected status.

9. A system comprising:
at least one processor; and
at least one memory, which when executed by the at least one processor provides operations comprising:
maintaining a plurality of business elements, each of the plurality of business elements being assigned with at least one of a plurality of statuses comprising a selection status and a changeability status, wherein at least one of the plurality of business elements comprise at least one business package, wherein the at least one business package comprises at least one business option;
maintaining a plurality of rules, wherein each of the plurality of rules specifies at least one of a plurality of semantic relationships between at least two of the plurality of business elements;
determining whether the at least one of the plurality of statuses of the plurality of business elements are consistent with each other based on the at least one of the plurality of semantic relationships among the plurality of business elements and whether the at least one of the plurality of statuses of the plurality of business elements violate at least one of the plurality of rules; and
generating a solution to solve an inconsistency, when the at least one of the plurality of statuses of the plurality of business elements are inconsistent.

10. The system of claim 9, wherein the mass storage device further maintains a plurality of rules, wherein each of the plurality of rules specifies a relationship between at least two of the plurality of business elements.

11. The system of claim 10, wherein determining whether statuses of the plurality of business elements are consistent with each other comprises determining whether the plurality of statuses of the plurality of business elements violate at least one of the plurality of rules.

12. The system of claim 10, wherein automatically generating a solution to solve the inconsistency comprises:
identifying a business element from the plurality of business elements, the business element's status violating a predetermined number of rules of the plurality of rules; and
changing the business element's status.

13. The system of claim 12, wherein a business element's status is considered as violating a rule if the business element's status together with at least one other business element's status contradict with the rule.

14. The processing system of claim 9, wherein the selection status comprises a selected status or a deselected status.

15. The method of claim 1, wherein the generating further comprises:
determining, at a solution generator of a enterprise resource planning system, the solution to solve the inconsistency based on changing the at least one of the plurality of statuses of a least number of the plurality of business elements, and wherein the at least one processor comprises the enterprise resource planning system.

* * * * *